United States Patent [19]

Häusler et al.

[11] Patent Number: 5,084,812
[45] Date of Patent: Jan. 28, 1992

[54] ARRANGEMENT FOR CONVERTING TWO SINGLE-PHASE ALTERNATING CURRENTS INTO A SYMMETRIC THREE-PHASE CURRENT

[75] Inventors: Michael Häusler, Weilheim, Fed. Rep. of Germany; Josef Käuferle, Oberrohrdorf, Switzerland

[73] Assignee: Asea Brown Boveri Ltd., Baden, Switzerland

[21] Appl. No.: 598,213

[22] Filed: Oct. 16, 1990

[30] Foreign Application Priority Data

Oct. 19, 1989 [DE] Fed. Rep. of Germany ....... 3934836

[51] Int. Cl.$^5$ ............................................. H02M 5/00
[52] U.S. Cl. .................................... 363/72; 363/153; 307/72
[58] Field of Search ................. 363/1, 3, 35, 36, 153, 363/154, 5, 37, 64, 71, 72; 307/72, 76, 84; 290/4 A

[56] References Cited

U.S. PATENT DOCUMENTS

| | | |
|---|---|---|
| 3,781,641 | 12/1973 | Rettig . |
| 4,625,269 | 11/1986 | Kangiesser ..................... 363/35 |
| 4,639,610 | 1/1987 | Del Vecchio et al. ............. 307/83 |
| 4,648,018 | 3/1987 | Neupauer ........................ 363/35 |
| 4,800,481 | 1/1989 | Knaffl et al. . |

FOREIGN PATENT DOCUMENTS

| | | |
|---|---|---|
| 1538349 | 4/1969 | Fed. Rep. of Germany . |
| 1943646 | 3/1971 | Fed. Rep. of Germany . |
| 3150385 | 6/1983 | Fed. Rep. of Germany . |
| 3347746 | 7/1985 | Fed. Rep. of Germany . |
| 3801878 | 8/1988 | Fed. Rep. of Germany . |
| 647623 | 1/1985 | Switzerland . |

OTHER PUBLICATIONS

"Digitale Untersuchung der Stabilitat von gleichstromgekoppelten Drehstromsystemen", Schmidt, MSR 15 (1972), pp. 296–299.
"Entwurf eines Leistungsreglers fur Moderne Netzkupplungsumformer", Von Gerhard, Heft 10 (43 Jahrgang 1972) Elektrische Bahnen, pp. 224–230.
"Berechnungen und vergleichende Messungen am System Stromrichter-Synchronmotor", Meyer et al., Brown Boveri Technik 2-85, pp. 71–77.
"Stromrichtererregung fur schnell-laufen Synchrongeneratoren", Gerlach, Techn. Mitt. AEG-Telefunken 68 (1978), pp. 57–66.
Patents Abstracts of Japan, E761, May 22, 1989, vol. 13/No. 218, "Generator Optimum Stabilizing Control Method", Mizutani.
"Begrenzung der Erregung von Synchronmaschinen", Eggeling, Brown Boveri Mitt. 11-76, pp. 682–687.

(List continued on next page.)

Primary Examiner—R. Skudy
Assistant Examiner—Emanuel Todd Voeltz
Attorney, Agent, or Firm—Burns, Doane, Swecker & Mathis

[57] ABSTRACT

In order with a low degree of equipment complexity to convert two alternating-currents of 16 ⅔ Hz of two separate single-phase generators (G1, G2) of approximately the same power into a three-phase current with 50 Hz, the single-phase generators are connected via a SCOTT transformer (Tr1) to a rectifier (SR1) of a converter with a direct-voltage intermediate circuit (3–6). The direct current transmitted through the direct-voltage intermediate circuit is transformed into three-phase current by two inverters (SR2, SR3) connected in series, and supplied to a national power system (10) via power transformers (Tr2, Tr3). The two single-phase generators (G1, G2) are controlled by one generator voltage controller (42) in each case, which affects the excitation of the single-phase generators (G1, G2) via a field rectifier (43), at the same amplitude of their generator voltages (u1, u2). Moreover, the single-phase generators (G1, G2) are controlled at a phase shift of their generator voltages (u1, u2) of 90°$_{el}$ by a load angle controller as a function of the load angles (δ1, δ2). For this purpose, desired-value signals (P1$_s$, P2$_s$) are formed by a turbine balance controller in order to control the fuel supply of turbines (Tu1, Tu2), which drive the single-phase generators (G1, G2).

8 Claims, 2 Drawing Sheets

OTHER PUBLICATIONS

"Polradwinkelregelung fur Synchronmaschinen", Von Dietrich Ernst, et al., Elektrizitatswirtschaft, Jg. 64 (1965), pp. 121–127.

Taschenbuch Elektsotechnik, Bond 5, VEB Verlag Technik Berlin, 1980, Prof. Dr. Eugen Philippow, pp. 835–836.

"Handbuch fur Hochfrequenz-und Elektro-Techniker", Fachworterbuch, pp. 618–619.

"Programmable Processor for the Control of HVDC and SVS", Stemmler et al., Canadian Electrical Association Meeting, Mar. 25–29, 1984.

ARRANGEMENT FOR CONVERTING TWO SINGLE-PHASE ALTERNATING CURRENTS INTO A SYMMETRIC THREE-PHASE CURRENT

BACKGROUND OF THE INVENTION

Field of the Invention

The invention proceeds from an arrangement for converting 2 single-phase alternating currents into a symmetric three-phase current according to the preamble of patent claim 1.

DISCUSSION OF THE INVENTION

The invention relates by means of the preamble to a prior art as disclosed in U.S. Pat. No. 4,800,481. A converter with a direct-voltage intermediate circuit is specified there, which connects a traction system with 16 ⅔ Hz to a national power system with 50 Hz. In this arrangement, a voltage summing transformer with a plurality of subtransformers is connected, on the one hand, to the traction system and, on the other hand, via a four-quadrant controller per subtransformer, in each case to the direct voltage intermediate circuit.

SUMMARY OF THE INVENTION

Accordingly, one object of this invention is, as defined in patent claim 1, to convert the alternating current of two separate single-phase generators of approximately the same power and having a first alternating-current frequency into a three-phase current having a second alternating-current frequency. The conversion is to take place with a low degree of equipment complexity.

An advantage of the invention consists in the slight reaction of the 6-pulse harmonics stirrer to the single-phase generators, and in the simple matching of the rectifier-side alternating voltage via at least one transformer. The arrangement according to the invention is particularly suitable for only one direction of power flow, i.e. for supplying the national power system by means of two single-phase generators.

If two single-phase generators having a 90° phase shift were to be connected in series or parallel via a rectifier without a transformer, the result would be a 4-pulse circuit which would require a greater filter complexity in the direct-voltage intermediate circuit than the 6-pulse circuit. Without a load angle controller, synchronism would not be guaranteed with such a device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
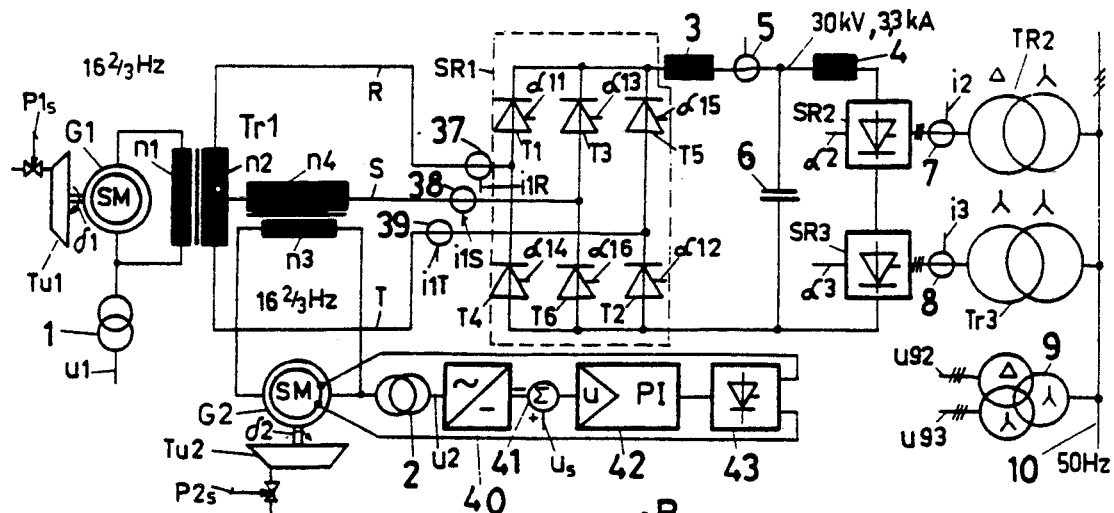
FIG. 1 shows a block diagram of an arrangement for converting 2 single-phase alternating currents into a symmetric three-phase current comprising a converter with a rectifier, which is connected on the alternating current side via a SCOTT transformer to 2 single-phase generators, and which is connected via a direct-voltage intermediate circuit to 2 inverters connected in series, which are connected via power transformers to a national power system and to a control loop for a generator voltage.

Referring now to the drawings, wherein like reference numerals designate identical or corresponding parts throughout the several views, in FIG. 1 (G1) and (G2) designate synchronous machines or single-phase alternating voltage generators, which are driven by turbines (Tu1) or (Tu2) and generate generator voltages (u1) or (u2) of 16 ⅔ Hz, which can be detected as generator voltage signals (u1) or (u2) by means of alternating-voltage transformers (1) or (2). For the sake of simplicity, generator voltages and generator voltage signals proportional thereto are identically designated. The same holds for firing angles, desired and actual values as well as for firing-angle signals proportional thereto as well as for desired-value and actual-value signals. ($\delta 1$) and ($\delta 2$) designate load angle signals of the alternating-voltage generators (G1) or (G2), which are obtained through sensors of the generator shafts, and (P1$_s$) and (P2$_s$) denote other desired-value signals for controlling the fuel supply of the turbines (Tu1) or (Tu2).

The stator windings of the alternating-voltage generators (G1, G2) are connected in each case to the primary windings having numbers of transformer windings (n1) or (n3) of a special-purpose transformer for converting a three-phase line voltage into a three-phase output voltage, i.e. of a so-called SCOTT transformer (Tr1), as it is known, for example, from the Handbuch für Hochfrequenz- und Elektro-Techniker (Manual for Radio-frequency and Electrical Engineers), V.vol., Verlag für Radio-Photo-Kinotechnik GmbH, Berlin-Borsigwalde, 1957/1967, page 618. The secondary windings assigned to the primary windings have numbers of transformer windings (n2) or (n4) with winding ratios n2:n1=1:1 and n3:n4√3/2:1.

Alternating-current phases (R) and (T) are tapped from the secondary winding with the number (n2) of transformer windings, and the alternating-current phase (S) is tapped from the secondary winding with the number (n4) of transformer windings, which alternating-current phases are supplied via alternating-current transformers (37-39) to alternating-current inputs of a controlled first static converter or bridge-connected rectifier (SR1). Alternating-current signals ($i_{1R}$, $i_{1S}$, $i_{1T}$) can be tapped at outputs of the alternating-current transformer (37-39). The static converter (SR1) is line-commutated and has thyristors (T1-T6) in the bridge arms, which can be connected as a function of firing angle signals ($\alpha 11-\alpha 16$).

(SR2) and (SR3) designate two inverters connected in series or second or third static converters for 12-pulse operation, which can be line-commutated or self-commutated. They are constructed in a manner identical to the first static converter (SR1). On the direct-current side, they are connected via a direct-voltage intermediate circuit, which has two intermediate-circuit reactors (3) and (4) connected in series via a direct-voltage detector (5) and an intermediate-circuit capacitor (6), to the direct-voltage output of the first static converter (SR1), and on the alternating-current side via alternating-current transformers (7) or (8) and power transformers (Tr2) or (Tr3), connected in series thereto, with star-delta or duplex star connection to an alternating-current system or inverter system or national power system (10) with a line frequency of 50 Hz. Alternating-current signals (i2) or (i3) can be tapped at the outputs of the alternating-current transformers (7, 8). Firing-angle signals for the static converters (SR2) and (SR3) are designated by ($\alpha$2) or ($\alpha$3). The converter consisting of a rectifier (SR1), the direct-voltage intermediate circuit (3–6) and the two inverters (SR2, SR3) is designed for a high-voltage direct-current transmission with a direct voltage of 30 kV and a direct current of 3.3 kA.

Designated by (9) is a voltage-image transformer for the power transformers (Tr2) and (Tr3), at which image-voltage signals (u92) and (u93) can be tapped.

Assigned to each alternating-voltage generator (G1, G2) is an identically constructed voltage control loop for holding constant the particular generator voltage (u1, u2), of which for the sake of clarity only that for the alternating-voltage generator (G2) is represented. The generator voltage (u2) is supplied via a rectifier with peak-value smoothing (40) to a negating input of a summer (41), to the non-negating input of which a predeterminable generator-voltage desired-value signal ($U_s$) is applied. On the output side, the summer (41) is connected via a generator-voltage controller (42) to a control input of a field rectifier (43), which supplies the field winding of the alternating-voltage generator (G2).

Figure 2:
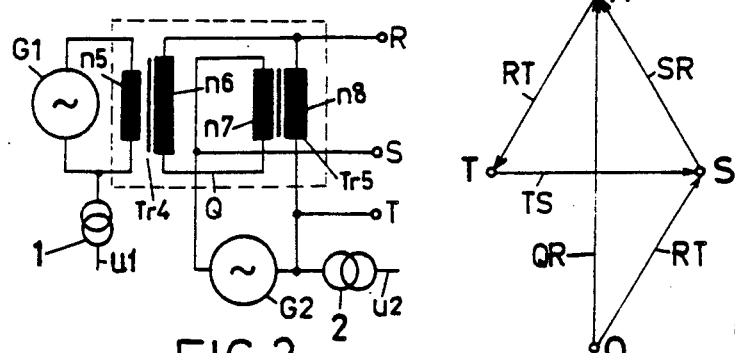
FIG. 2 shows a circuit diagram of two transformers, which can be used instead of the SCOTT transformer in the case of the arrangement in accordance with FIG. 1.

FIG. 2 shows two special-purpose transformers (Tr4) and (Tr5), enclosed in dashed lines, with primary windings, which have numbers (n5) or (n7) of transformer windings, and with secondary windings, which have numbers (n6) or (n8) of transformer windings. These special-purpose transformers (Tr4, Tr5) can be used instead of the SCOTT transformer (Tr1) in accordance with FIG. 1. They have fewer tapping points than the SCOTT transformer (Tr1), and can also be united to form a single transformer on a common iron core. The winding ratios are: n5:n6=1:$\sqrt{3}$ and n7:n8=1:1. The first alternating-voltage generator (G1) is connected to the primary winding of the transformer (Tr4). The alternating-voltage generator (G2) is connected to a first end, forming the T-phase, of the secondary winding and to a first end, forming the S-phase, of the primary winding of the transformer (Tr5). A second end of the secondary winding of the transformer (Tr5) is connected with a first end of the secondary winding of the transformer (Tr4) and forms the alternating-current phase (R) for the first static converter (SR1). A second end, denoted by (Q), of the primary winding of the transformer (Tr5) is connected to a second end of the secondary winding of the transformer (Tr4).

Figure 3:
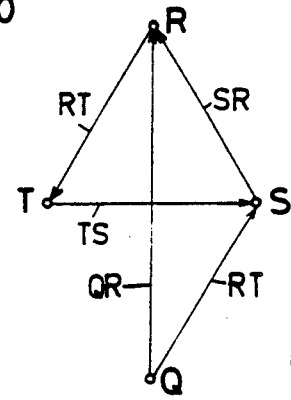
FIG. 3 shows a voltage-vector diagram for the transformers in accordance with FIG. 2.

FIG. 3 shows by means of voltage vectors (SR, RT, −RT, TS, QR), the voltage ratios at these special-purpose transformers (Tr4, Tr5). It is assumed that |u1| = |u2|, i.e. that the generator voltages (u1) and (u2) are controlled to the same amplitude by means of the particular generator-voltage controller (42). It then holds that:

$$QR = -RT + SR = u1 \cdot \sqrt{3}.$$

Figure 4:
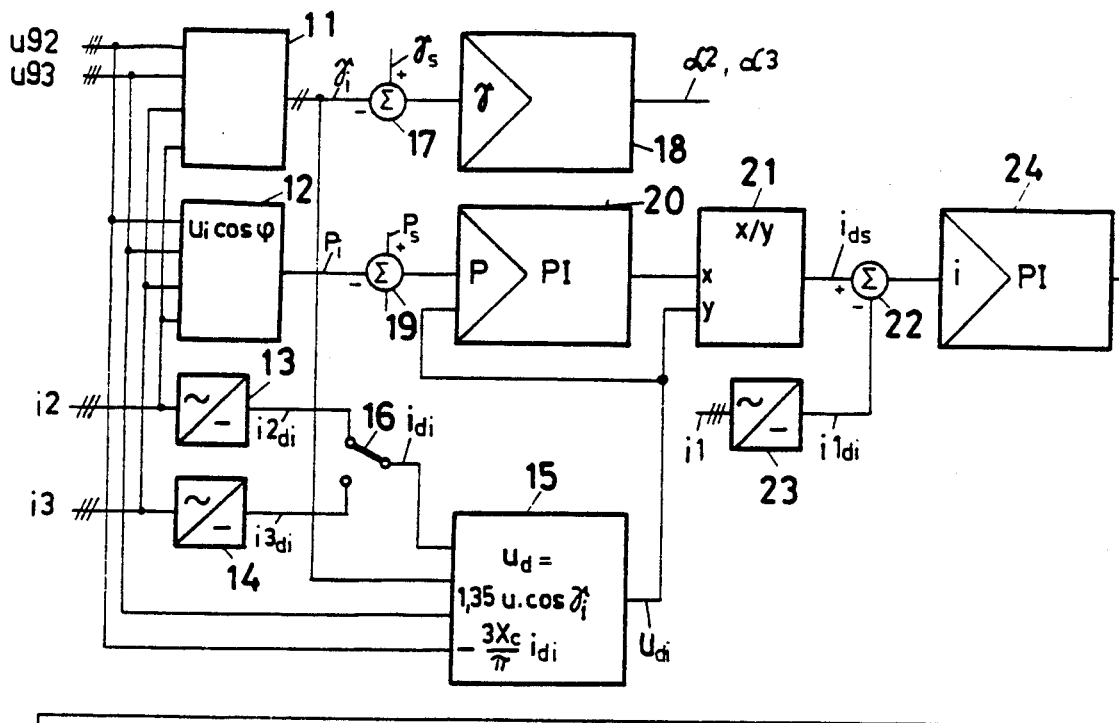
FIG. 4 shows a block diagram of the control structure for operating the arrangement in accordance with FIG. 1.
Figure 4:
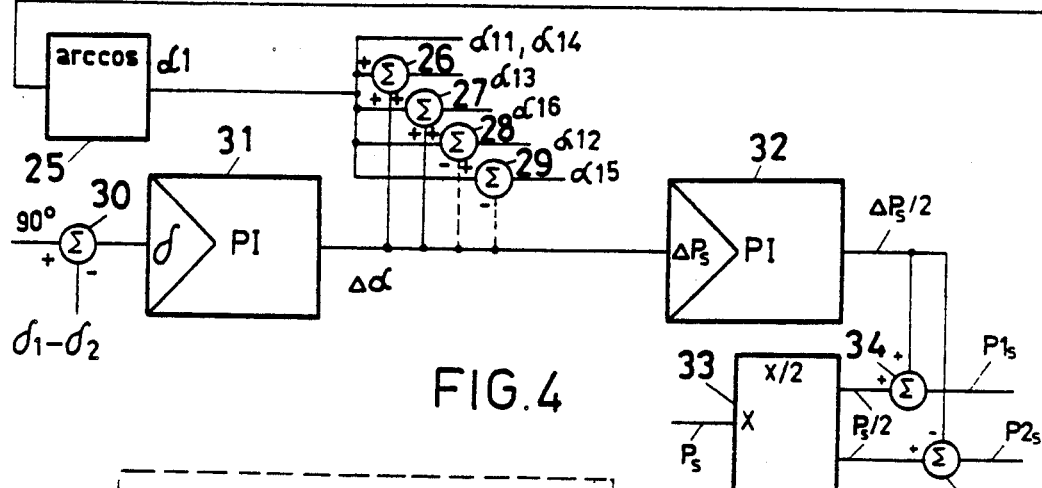

Designated in FIG. 4 by the reference symbol (11) is an extinction angle actual-value calculator, described in more detail in connection with FIG. 5, to which on the input side the image-voltage signals (u92) and (u93) and the alternating-current signals (i2) and (i3) are supplied. On the output side, extinction angle actual-value signals ($\gamma_i$) or ($\gamma_{SR2i}$, $\gamma_{SR3i}$) are supplied to a negating input of a summer (17), to the non-negating input of which a predeterminable extinction angle actual value, corresponding preferably to 17°$_{el}$, is applied. On the output side, the summer (17) is connected for control purposes to an extinction-angle controller (18), at which firing-angle signals ($\alpha$2, $\alpha$3), in accordance with $\alpha=180°-\gamma$ can be tapped for the purpose of switching on the valves of the inverters (SR2, SR3). Naturally, a summer (17) and an extinction-value controller (18) are provided for each inverter (SR2, SR3) in accordance with the two extinction angle actual-value signals ($\gamma_{SR2i}$) and ($\gamma_{SR3i}$), cf. FIG. 5. and with the two firing-angle signals ($\alpha$2, $\alpha$3). Owing to the fact that the inverters (SR2) and (SR3) are operated with a constant extinction angle ($\gamma$), the firing angles ($\alpha$2) and ($\alpha$3) determine, in conjunction with the particular operating current (i2, i3), the direct voltage of the direct-voltage intermediate circuit (3–6). Such an extinction-angle controller is described in the lecture report: H. Stemmler et al., PROGRAMMABLE PROCESSOR FOR THE CONTROL OF HVDC AND SVS, CANADIAN ELECTRICAL ASSOCIATION, Engineering and Operating Division Meetings, Toronto, Canada, Mar. 25–29, 1984, in connection with FIG. 6 there.

Designated by (12) is an effective-power calculator, which uses the fundamental wave of the image-voltage signals (u92, u93) and the alternating-current signals (i2, i3) of the inverters (SR2, SR3) to form for the particular alternating-current phase (R, S, T) the products for the electrical power U . i . cos $\phi$ and averages these 6 product values to form a single power actual-value signal (Pi), ($\phi$) being the phase angle between the particular voltage (U) and the particular current (i).

The power actual-value (Pi) is supplied to a negating input of a summer (19), a non-negating input of which a power desired-value signal (Ps) that can be predetermined by a primary control is applied. On the output side, the summer (19) is connected via a first control input to an output regulator (20) with proportional-plus-integral or PI characteristics, the output of which is connected to the dividend input of a divider (21), at which a direct-current desired-value signal ($i_{ds}$) can be tapped. A direct-voltage actual-value signal ($U_{di}$) is supplied from the output of a computer or a direct-voltage actual-value calculator (15) to the second input of the output regulator (20) and to a devisor input of the divider (21).

The reference symbols (13), (14) and (23) designate direct-current actual-value calculators, such as are known, for example, from the Taschenbuch Elektrotechnik (Manual of Electrotechnology), vol. 5, VEB Verlag Technik Berlin, 1980, editor: E. Philippow, pages 835–836, which deliver current actual-value signals (i1$_{di}$) or (i2$_{di}$) or (i3$_{di}$) as a function, in each case, of input-side alternating-current actual-value signals (i1) or (i2) or (i3).

Via a changeover switch (16), the current actual-value signals (i2$_{di}$) and (i3$_{di}$) are supplied as current actual-value signals (i$_{di}$) to a first input of the direct-current actual-value calculator (15), which additionally receives on the input side the image-voltage signals (u92, u93) and the extinction-angle actual-value signal ($\gamma_i$) from the output of the extinction-angle actual-value calculator (11). The direct voltage $$U_d = 1.35 \cdot U \cdot \cos \gamma_i - 3 \cdot X_c \cdot i_{di} / \pi$$

is computed in the direct-current actual-value calculator (15) for the alternating-current phases (R, S, T) of the inverters (SR2, SR3), X$_c$ being a predeterminable constant signifying the short-circuit reactance of the SCOTT transformer (Tr1) or of the transformers (Tr4) and (Tr5), and (U) signifying a voltage signal that can be one of the image-voltage signals (u92) or (u93) corresponding to the position of the changeover switch (16). The direct-voltage actual-value signal (U$_{di}$) at the output of the direct-current actual-value calculator (15) follows from the 6 computed (U$_d$) values by averaging.

The direct-current desired-value signal (i$_{ds}$) is supplied to a non-negating input, and the current actual-value signal (i1$_{di}$) to a negating input of a summer (22). On the output side, the summer (22) is connected for control purposes via a direct-current controller (24) with PI characteristics, which is subordinate to the output regulator (20), and via an arccos element (25) downstream of the latter, which serves to linearize the control characteristic and to which there is applied on the outside in accordance with a firing-angle signal ($\alpha$1) a firing signal for the thyristors (T1-T6) of the static converter (SR1), to the control inputs of thyristors (T1, T4) and via negating inputs of summers (26-29) to thyristors (T3, T6, T2, T5).

A non-negating input of one summer (30) is supplied with a 90° signal, and a negating input is supplied with a difference signal $\delta1-\delta2$ of the load angle signals ($\delta1$) and ($\delta2$) of the alternating-voltage generators (G1) or (G2). On the output side, the summer (30) is connected for control purposes via a load angle controller (31) with PI characteristics, at which a firing-angle difference signal ($\Delta\alpha$) can be tapped on the output side, to a turbine balance controller (32) with PI characteristics, at which a 50% power difference desired-value signal ($\Delta P_s/2$) can be tapped on the output side. The firing-angle difference signal ($\Delta\alpha$) is supplied to non-negating inputs of the summers (26) and (27), at which the firing-angle signals ($\alpha$13) or ($\alpha$16) for the thyristors (T3) or (T6) can be tapped on the output side, and to negating inputs of the summers (28) and (29), at which the firing-angle signals ($\alpha$12) or ($\alpha$15) for the thyristors (T2) or (T5) can be tapped on the output side. Whereas the load angle controller (31) controls rapidly, i.e. within one period of the traction frequency of 16 ⅔ Hz, the turbine balance controller (32) controls slowly, i.e. within 1 s–1 min, an instantaneous load angle deviation 90° $-(\delta1-\delta2)$ of 2°-3° from the desired 90° value having to be accepted.

The power desired-value signal (P$_s$) is supplied to a divider (33), which halves the value of the power desired-value signal (P$_s$) to a 50% power desired-value signal (P$_s$/2), which is supplied to non-negating inputs of summers (34) and (35). On the one hand, the 50% power difference desired-value signal ($\Delta P_s/2$) is supplied to a further non-negating input of the summer (34), at which the power desired-value signal (P1$_s$) for controlling the turbine (Tu1) can be tapped on the output side, and, on the other hand, to a negating input of the summer (35), at which the power desired-value signal (P2$_s$) for controlling the turbine (Tu2) can be tapped on the output side.

Figure 5:
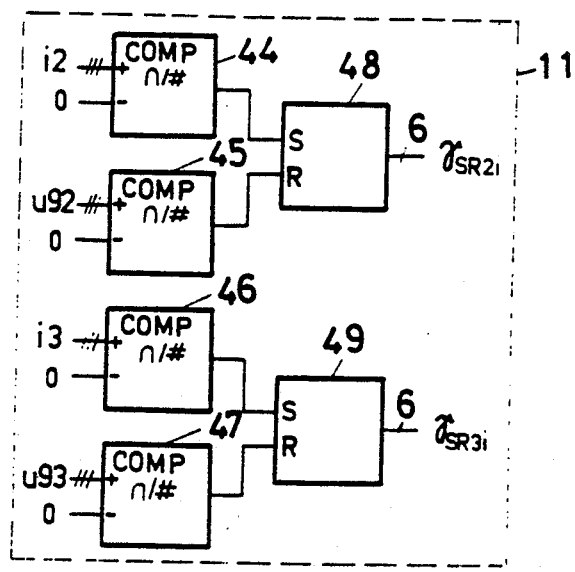
FIG. 5 shows a block diagram of an extinction angle actual-value calculator of the control structure in accordance with FIG. 1, and FIGS. 6(a)-(e) show signal diagrams of firing signals for thyristors and of thyristor currents of the rectifier in accordance with FIG. 1.

The extinction angle actual-value calculator (11) is represented in detail in FIG. 5. Alternating-current signals and image-voltage signals (i2) or (u92) from the alternating-current inputs of the static converter (SR2) and (i3) or (u93) from the alternating-current inputs of the static converter (SR3) are supplied on the input side of the zero detectors (44-47).

On the output side, the zero detectors (44) and (45) are connected to S or R inputs of a flipflop or SR sweep element (48), at which the extinction angle actual-value signal ($\gamma_{SR2i}$) for the static converter (SR2) can be tapped on the output side. On the output side, the zero detectors (46) and (47) are connected to S or R inputs of a flipflop or SR sweep element (49), at which the extinction angle actual-value signal ($\gamma_{SR3i}$) for the static converter (SR3) can be tapped on the output side.

The zero-crossing signals of the valve currents that are relevant for formation of the extinction angle ($\gamma$) are always associated with the end of the current block. The outputs of the SR sweep elements (48, 49) are set to logic 1 by means of these signals. The output of the particular SR sweep element is reset to logic 0 by means of the zero-crossing signal of the associated voltage following thereafter. The duration of the state logic 1 is a direct image of the extinction angle ($\gamma$).

Figure 6:
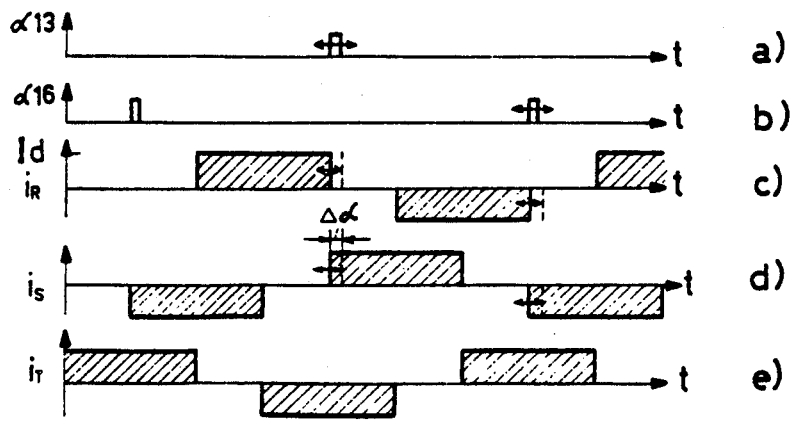

The action of the arrangement according to the invention is to be explained below in connection with the diagrams of FIG. 6. The two single-phase alternating-voltage generators (G1, G2) driven by turbines (Tu1) or (Tu2), which are designed for an electric power of 50 MW and a traction system frequency of 16 ⅔ Hz, in each case, are intended to feed electric energy into a national power system (10) with a line frequency of 50 Hz via a special-purpose transformer (Tr1; Tr4, Tr5) and a converter (SR1, 3-6, SR2, SR3), which can be a HVDCT system. A reversal of the power direction is possible in principle using the so-called marginal current method.

A first condition for the operation of such an arrangement with minimum equipment complexity is the control of both alternating-voltage generators (G1, G2) at constant no-load voltage, i.e. it is to hold that u1=u2-=u$_s$. To meet this condition, it is sufficient to control the field current of the alternating-voltage generators (G1, G2) as a function of the particular smooth peak value of the alternating voltage (u1, u2) on the static converter side using a generator voltage controller (42) in each case.

A second condition is the operation of both alternating voltage generators (G1, G2) with generator voltages (u1, u2) offset by 90°$_{el}$. To meet this condition, an addition to the usual static converter control is required, since only the latter is rapid enough to produce the synchronism of the two electrically-separated alternating-current generators (G1, G2). This addition is the load angle controller (31).

It is firstly assumed that the ideal phase angle is present with 90° phase difference of the machine or generator voltages (u1, u2), and that the static converter valves or the thyristors (T1-T6) are fired equidistantly. In this case, $\Delta\alpha=0$. For the SCOTT transformer (Tr1), the resulting static converter-side currents (i$_R$), (i$_S$) and (i$_T$) are illustrated in FIGS. 6c to 6e on the assumption of an infinitely large smoothing reactor, assuming the winding ratios specified further above. In the case of equally large machine voltages u1=u2, fundamental-frequency currents ($I_{1G1}$) and ($I_{1G2}$) for the alternating-voltage generators (G1) or (G2) are given by $$I_{1G1} = I_{1G2} = 3 \cdot Id/(\sqrt{2} \cdot \pi),$$

where Id signifies the amplitude of the currents ($i_R$, $i_S$, $i_T$). The influence of the commutating reactances may firstly be neglected.

Since the turbine control is not exactly in equilibrium with the electrical powers, the alternating-current generators (G1, G2) drift away from the ideal operating point. The deviation from the ideal phase difference 90° generates the firing-angle difference signal ($\Delta\alpha$), see FIG. 4. The firing-angle difference signal ($\Delta\alpha$) can be used for the purpose of shifting the firing angle ($\alpha12$, $\alpha15$) of the thyristors (T2) and (T5) of the alternating-current phase (T) from a mean operating point of, e.g., $\alpha12=\alpha15=15°$, so that the power equilibrium and the phase angle of $90°_{el}$ are once again produced, before slipping yet comes about. For this purpose, it is necessary to detect the actual value of the phase angle between the two alternating-voltage generators (G1, G2), which is done by means of measuring or detecting the load angle ($\delta1$, $\delta2$).

A conscious slight deviation is made from the equidistant firing of the thyristors for the purpose of immediate matching to a power difference between the alternating-voltage generators (G1, G2). Given predominance of the power of the alternating-voltage generator (G1), the firing angles ($\alpha13$) and ($\alpha16$), cf. FIGS. 6a) and 6b) of the thyristors (T3) and (T6) of the alternating-current phase (S) are fired earlier by the firing-angle difference ($\Delta\alpha$), and given predominance of the power of the alternating-voltage generator (G2) with a delay of $\Delta\alpha$, cf. FIG. 6d). Given a firing delay, the current blocks of the thyristors (T3) and (T6) are shortened, while those of thyristors (T1) and (T4) of the alternating-current phase (R), cf. FIG. 6c), are lengthened to the same extent. As a result, the load of the alternating-voltage generator (G1) is increased, while that of (G2) is decreased. Given too large a load angle difference, this measure acts to promote a decrease. It is disadvantageous in this connection that the power factors of the alternating-voltage generators (G1, G2) are altered with this measure. If this effect is to be avoided, it is possible, as indicated with dashes, for the firing-angle difference signal ($\Delta\alpha$) to be used for the purpose of firing the thyristors (T2) and (T5) prematurely. The power of the alternating-voltage generator (G1) then predominates, if $\delta1-\delta2<90°$.

The 50% power desired value halved in the divider (33) represents the ideal desired value for the turbine power control. In order to obtain the firing-angle difference signal ($\Delta\alpha$) at virtually 0, an additional or 50% power difference desired-value ($\Delta P_s/2$) is formed in the turbine balance controller (32), which is added to the ideal power desired-value for the turbine (Tu1), and subtracted from that of the turbine (Tu2).

It is important that the alternating-voltage generators (G1, G2) are controlled with the turbine control at a constant electrical power ratio and at a predeterminable sum of the two electrical powers. The inverters (SR2, SR3) are controlled with a constant extinction angle ($\gamma$).

Naturally, instead of the 12-pulse inverter (SR2, SR3), which favors harmonics, it is possible to use a 6-pulse inverter with only one three-phase bridge, which could be advantageous in the case of lower power or of a very strong inverter system (with a weak harmonic influence). Instead of simple thyristors (T1–T6), it is possible to make use in the inverters (SR1–SR3) of GTO thyristors with antiparallel diodes.

Instead of the alternating-current transformers (7, 8) for determining the direct current ($i_{di}$) flowing in the direct-current intermediate circuit (3–6), which direct current is required in the direct-voltage actual-value calculator (15) to compute the direct-voltage actual-value signal ($U_{di}$), it would also be possible to use the direct-voltage detector (5) in the direct-voltage intermediate circuit, which can otherwise be omitted and is relatively expensive.

Obviously, numerous modifications and variations of the present invention are possible in light of the above teaching. It is therefore to be understood that within the scope of the appended claims, the invention may be practised otherwise than as specifically described herein.

What is claimed as new and desired to be secured by Letters Patent of the United States is:

1. An arrangement for converting two single-phase alternating-currents into a symmetric three-phase current, comprising:
   (a) a frequency converter including at least two static converters actively connected via a direct-voltage intermediate circuit,
   (b) said frequency converter having at least one first static converter actively connected on the alternating-current side to at least two single-phase alternating-current terminals, and
   (c) at least one second static converter actively connected on the alternating-current side to a symmetric three-phase current terminal,
   (d) wherein said at least one first static converter is a three-phase bridge-connected rectifier actively connected on the alternating-current side via at least one first transformer and to one first alternating-voltage generator as well as to a separate second alternating-voltage generator;
   (e) an output regulator; and
   (f) a current controller associated with said output regulator for generating plural firing-angle signals for said first static converter.

2. The arrangement as claimed in claim 1, wherein the first transformer is a SCOTT transformer (Tr1).

3. The arrangement as claimed in claim 1, wherein
   (a) the at least one first static converter (SR1) is actively connected via two electrically mutually connected second and third transformers (Tr4, Tr5),
   (b) the second transformer (Tr4) being connected to at least one primary coil of the first alternating-voltage generator and
   (c) a third transformer (Tr5) being connected via the primary coil (n7) and secondary coil (n8) thereof to the second generator, the secondary coil (n6) of the third transformer being connected in series via the secondary coil (n8) of the second transformer to the primary winding of the third transformer, and
   (d) wherein first and third taps (RT) for the three-phase current are actively connected to ends of the secondary winding (n8) of the third transformer (Tr4), and a tap (S) for the three-phase current is actively connected with the electrical terminal of the second alternating-voltage generator (G2) to the primary winding of the third transformer (Tr5).

4. The arrangement as claimed in claim 1, wherein
(a) there is provided for each generator (G1, G2) a generator voltage controller (38), which controls the output voltage (u1, u2) of the particular generator at a predeterminable generator voltage desired-value ($U_s$), and
(b) which is connected on the output side for control purposes to the supply (39) of the field winding of the particular generator.

5. The arrangement as claimed in claim 1 wherein load angle controllers (31) are provided, which control the load angles ($\delta 1$, $\delta 2$) of the two alternating-voltage generators (G1, G2) at a relative mutual phase difference of $90°_{el}$.

6. The arrangement as claimed in claim 5, wherein the firing-angle signals ($\alpha 11-\alpha 16$) of the first static converter (SR1) are formed as a function of the output signal ($\Delta\alpha$) of at least one load angle controller (31).

7. The arrangement as claimed in claim 5, wherein
(a) a turbine balance controller (32) with proportional-plus-integral characteristics is provided, the dependence of which upon an output signal or firing-angle difference signal ($\Delta\alpha$) of at least one load angle controller (31) controls two separate turbines (Tu1, Tu2), which drive the alternating-voltage generators (G1, G2), at a constant ratio of their powers, which are transmitted in each case to the associated alternating-voltage generators, and
(b) at a constant sum of these powers.

8. The arrangement as claimed in claim 7, wherein
(a) a first summing element (34) is provided, in which a signal that is assigned to the transmission power desired-value ($P_s/2$) and an output signal or the 50% power difference desired-value signal ($\Delta P_s/2$) of the turbine balance controller (32) are superimposed additively on a first power desired-value ($P1_s$) for a first turbine (Tu1), and
(b) a second summing element (35) is provided, in which the signal that is assigned to the transmission power desired-value ($P_s/2$) and the output signal ($\Delta P_s/2$) of the turbine balance controller (32) are superimposed subtractively on a second power desired-value ($P2_s$) for a second turbine (Tu2).

* * * * *